(12) United States Patent
Chiou et al.

(10) Patent No.: US 6,754,042 B1
(45) Date of Patent: Jun. 22, 2004

(54) DISK DRIVE COMPRISING A NOTCHED DISK CLAMP FOR IMPROVED DISK BALANCE

(75) Inventors: Shan-Shuong Chiou, Saratoga, CA (US); Yao-Hsin Huang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/286,238

(22) Filed: Oct. 31, 2002

(51) Int. Cl.[7] .............................................. G11B 17/02
(52) U.S. Cl. .................................................. 360/99.12
(58) Field of Search ........................ 360/97.01, 98.01, 360/98.08, 99.05, 99.12

(56) References Cited

U.S. PATENT DOCUMENTS

| | | | | |
|---|---|---|---|---|
| 4,561,035 A | * | 12/1985 | McDorman et al. | 360/137 |
| 5,130,870 A | * | 7/1992 | Jabbari | 360/99.08 |
| 5,422,776 A | * | 6/1995 | Thorson et al. | 360/98.07 |
| 5,517,376 A | * | 5/1996 | Green | 360/98.08 |
| 5,555,144 A | * | 9/1996 | Wood et al. | 360/98.08 |
| 5,790,345 A | | 8/1998 | Alt | 360/98.08 |
| 5,877,571 A | * | 3/1999 | Brooks | 360/99.12 |
| 6,158,112 A | * | 12/2000 | Kim et al. | 29/759 |
| 6,178,063 B1 | * | 1/2001 | Wood et al. | 360/98.08 |
| 6,430,002 B1 | * | 8/2002 | Voights | 360/99.12 |
| 6,484,575 B2 | * | 11/2002 | Horning et al. | 73/487 |
| 6,504,674 B2 | * | 1/2003 | Yoshida et al. | 360/99.12 |
| 6,507,555 B1 | * | 1/2003 | Masaki et al. | 369/263 |
| 6,542,330 B1 | * | 4/2003 | Choo et al. | 360/99.12 |
| 6,550,328 B1 | * | 4/2003 | Horning et al. | 73/468 |
| 6,594,109 B2 | * | 7/2003 | Renken | 360/98.08 |
| 6,678,114 B2 | * | 1/2004 | Jicrapipalanakul et al. | 360/99.08 |
| 2002/0069509 A1 | * | 6/2002 | Choo et al. | 29/603.03 |
| 2003/0112552 A1 | * | 6/2003 | Choo et al. | 360/99.12 |

* cited by examiner

*Primary Examiner*—Jefferson Evans
(74) *Attorney, Agent, or Firm*—Won Tae C. Kim, Esq.; Milad G. Shara, Esq.; Howard H. Sheerin, Esq.

(57) ABSTRACT

A disk drive is disclosed comprising a disk, a spindle motor for rotating the disk, and a head actuated radially over the disk. A disk clamp clamps the disk to a hub of the spindle motor, wherein the disk clamp comprises a notch at a predetermined location along an outer diameter of the disk clamp. The disk is aligned non-concentric with the hub such that a center of the disk is aligned offset from a center of the hub toward the notch. The notch substantially counteracts an imbalance due to the non-concentric alignment of the disk with respect to the hub.

8 Claims, 6 Drawing Sheets

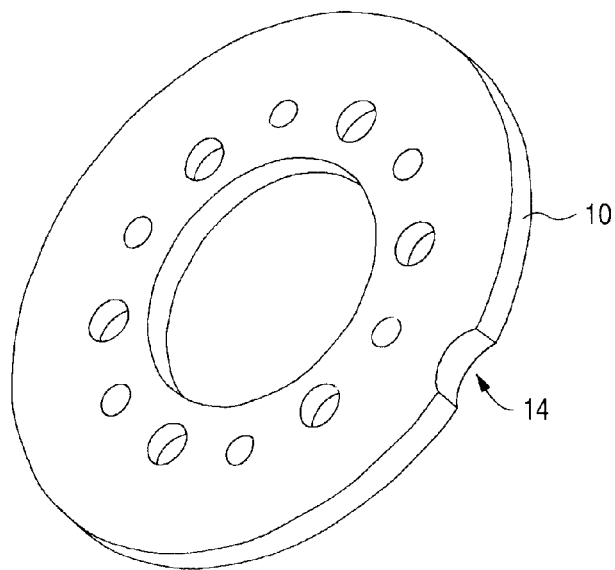
FIG. 2A
FIG. 2B
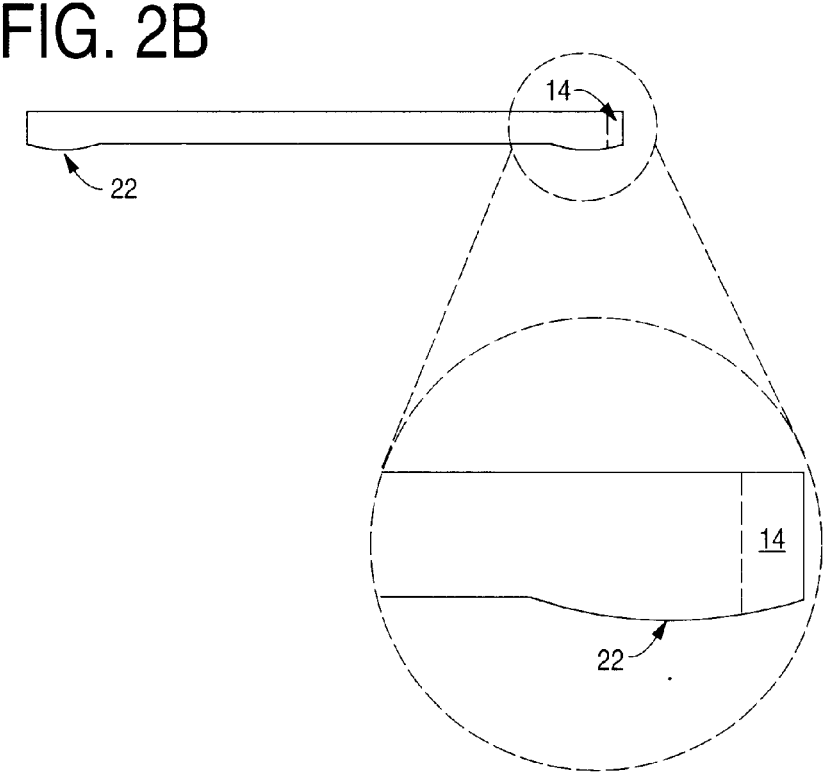
FIG. 2C

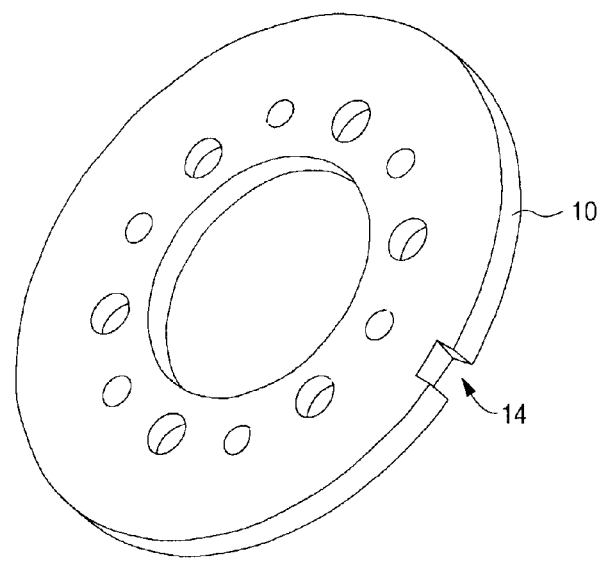
FIG. 3A
FIG. 3B
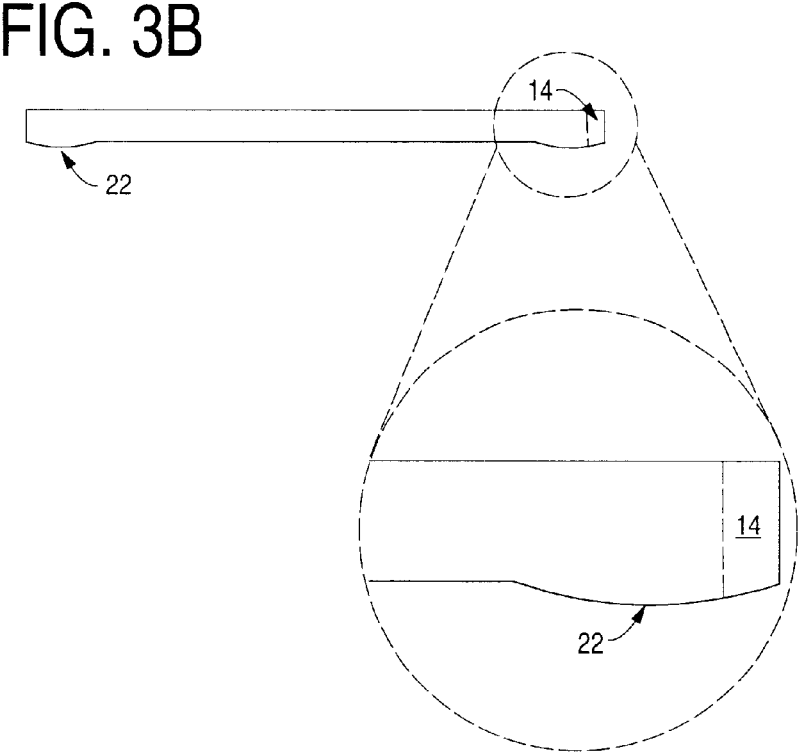
FIG. 3C

DISK DRIVE COMPRISING A NOTCHED DISK CLAMP FOR IMPROVED DISK BALANCE

BACKGROUND OF THE INVENTION

1. Field of the Invention

The present invention relates to disk drives for computer systems. More particularly, the present invention relates to a disk drive comprising a notched disk clamp for improved disk balance.

2. Description of the Prior Art

In disk drives, such as in "single-disk" disk drives, a disk clamp clamps a disk to the hub of a spindle motor to form a "disk pack". A head is actuated radially over the disk while the spindle motor rotates the disk at a predetermined angular velocity. It is important to manufacture the disk pack so that it is properly balanced to minimize disk wobble. One technique for achieving proper balance is to center the disk with respect to the hub; however, this increases the manufacturing cost by requiring extremely tight tolerances and/or sophisticated positioning mechanics while clamping the disk to the hub. Other techniques include decreasing the tolerance on the concentricity of the disk with respect to the hub and compensating for the imbalance using a micro-actuator in a feed-forward, servo control system. However, the micro-actuator and feed-forward servo control system increase the cost and complexity of the disk drive.

There is, therefore, a need to cost-effectively compensate for the imbalance of a disk pack in a disk drive caused by the non-concentric alignment of the disk with respect to the hub of the spindle motor.

SUMMARY OF THE INVENTION

The present invention may be regarded as a disk drive comprising a disk, a spindle motor for rotating the disk, and a head actuated radially over the disk. A disk clamp clamps the disk to a hub of the spindle motor, wherein the disk clamp comprises a notch at a predetermined location along an outer diameter of the disk clamp. The disk is aligned non-concentric with the hub such that a center of the disk is aligned offset from a center of the hub toward the notch. The notch substantially counteracts an imbalance due to the non-concentric alignment of the disk with respect to the hub. The notch may be formed from any suitable shape, including an arc shape or a square shape.

In one embodiment, an interior diameter of the disk presses against an outer diameter of the hub at a location substantially opposite the location of the notch.

The present invention may also be regarded as a method of manufacturing a disk drive. A disk is placed onto a hub of a spindle motor, and a disk clamp is placed over the disk. The disk clamp comprises a notch at a predetermined location along an outer diameter of the disk clamp. The disk is biased in a planar direction toward the notch while securing the disk clamp to the hub. The disk is aligned non-concentric with the hub such that a center of the disk is aligned offset from a center of the hub toward the notch. The notch substantially counteracts an imbalance due to the non-concentric alignment of the disk with respect to the hub.

BRIEF DESCRIPTION OF THE DRAWINGS

FIG. 2A shows an embodiment of the disk clamp wherein the notch comprises an arc shape.

FIGS. 2B–2C show a side view of the disk clamp of FIG. 2A, wherein the notch does not substantially affect the force distribution of the disk clamp.

FIG. 3A shows an embodiment of the disk clamp wherein the notch comprises a square shape.

FIGS. 3B–3C show a side view of the disk clamp of FIG. 3A, wherein the notch does not substantially affect the force distribution of the disk clamp.

DESCRIPTION OF THE PREFERRED EMBODIMENTS

Figure 1:
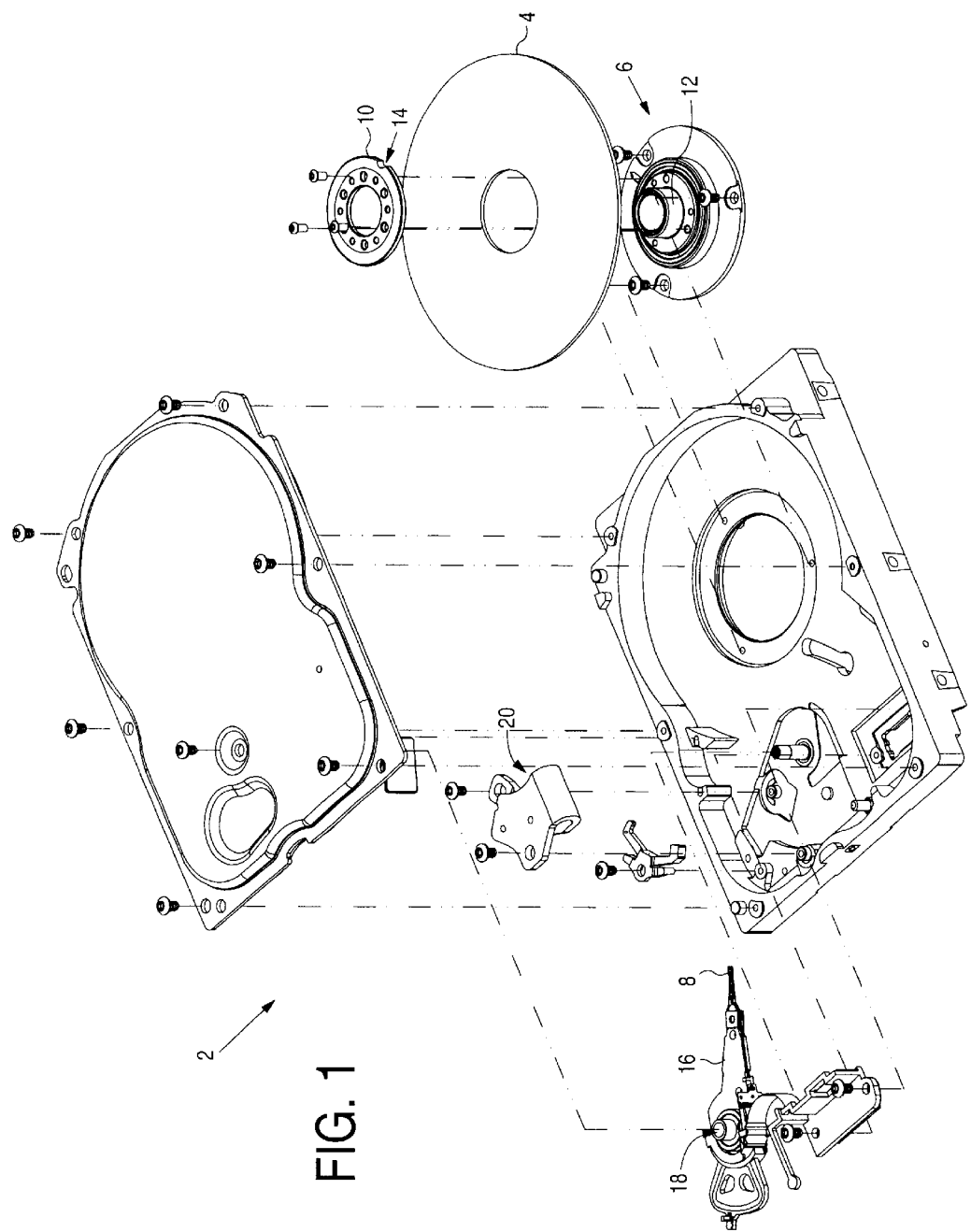
FIG. 1 shows a disk drive according to an embodiment of the present invention wherein a disk is clamped to the hub of a spindle motor using a disk clamp having a notch at the outer diameter which improves disk balance.

FIG. 1 shows a disk drive 2 according to an embodiment of the present invention comprising a disk 4, a spindle motor 6 for rotating the disk 4, and a head 8 actuated radially over the disk 4. A disk clamp 10 clamps the disk 4 to a hub 12 of the spindle motor 6, wherein the disk clamp 10 comprises a notch 14 at a predetermined location along an outer diameter of the disk clamp 10. The disk 4 is aligned non-concentric with the hub 12 such that a center of the disk 4 is aligned offset from a center of the hub 12 toward the notch 14. The notch 14 substantially counteracts an imbalance due to the non-concentric alignment of the disk 4 with respect to the hub 12.

The head 8 in the disk drive 2 of FIG. 1 is coupled to a distal end of an actuator arm 16 which is rotated about a pivot 18 by a voice coil motor 20 in order to actuate the head 8 radially over the disk 4 while the spindle motor 6 rotates the disk 4 at a predetermined angular velocity. The notch 14 in the disk clamp 10 improves disk balance so as to minimize disk wobble with respect to the head 8.

The notch 14 in the disk clamp 10 may comprise any suitable shape. FIG. 2A shows a disk clamp 10 according to an embodiment of the present invention wherein the notch 14 comprises an arc shape. The disk clamp 10 further comprises a number of apertures where screws are inserted for fastening the disk clamp 10 to the hub 12 of the spindle motor 6. However, any means for fastening the disk clamp 10 to the hub 12 of the spindle motor 6 may be employed in the embodiments of the present invention, including to "snap" the disk clamp onto the hub 12. FIG. 2B shows a side view of the disk clamp 10 of FIG. 2A, including a ring-shaped, beveled surface 22 which applies the clamping force to the disk 4. As seen from the magnified view of FIG. 2C, the depth of the notch 14 is limited so that it does not substantially affect the force distribution of the beveled surface 22.

FIG. 3A shows an embodiment of the disk clamp 10 wherein the notch 14 comprises a square shape. FIGS. 3B–3C show a side view of the disk clamp 10 wherein the depth of the notch 14 is limited so that it does not substantially affect the force distribution of the beveled surface 22.

Figure 4:
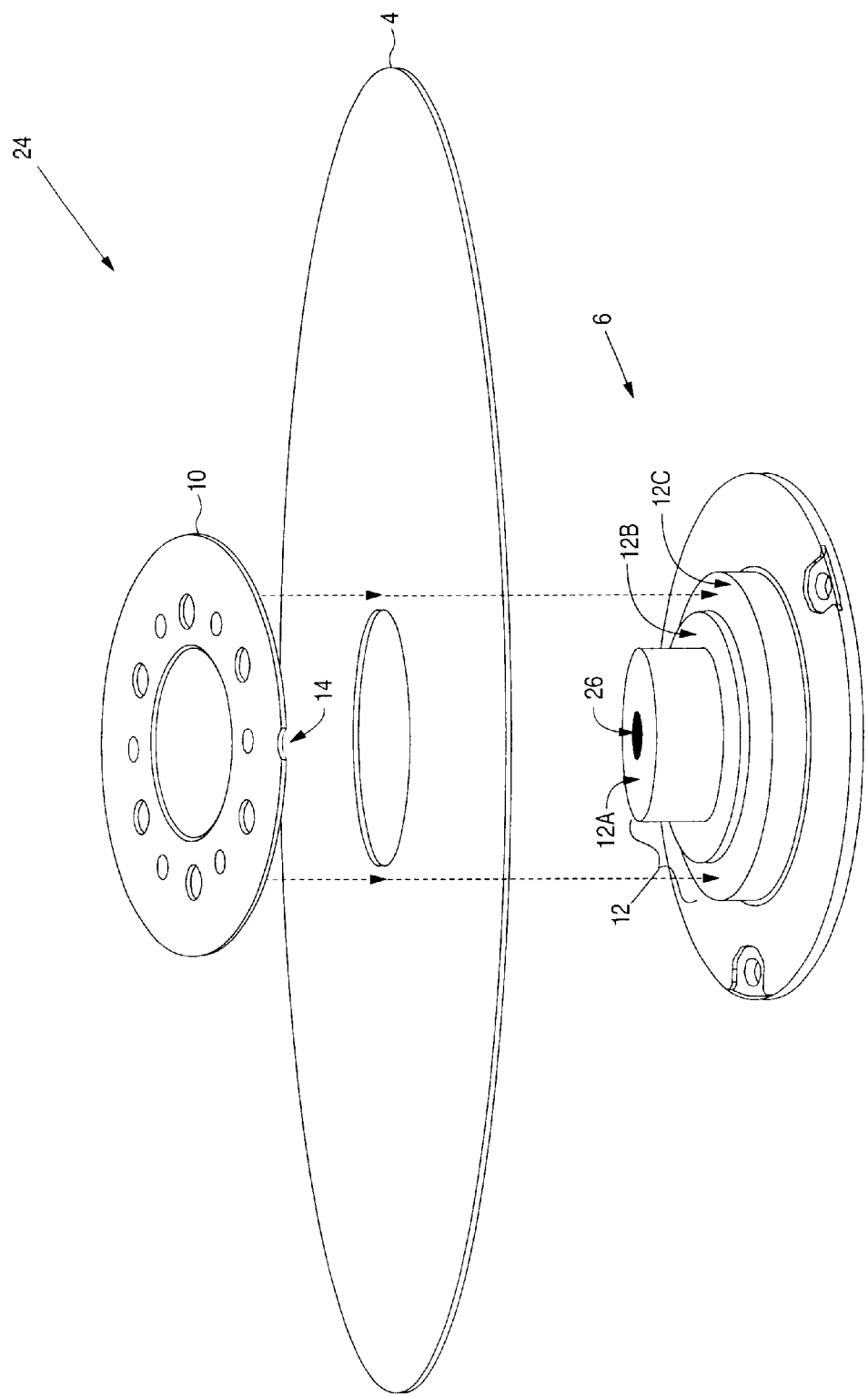
FIG. 4 illustrates the assembly process of the disk pack by installing the disk onto the hub of the spindle motor and placing the disk clamp over the disk according to an embodiment of the present invention.

FIG. 4 shows the assembly process for the disk pack 24 by installing the disk 4 onto the hub 12 of the spindle motor 6 and placing the disk clamp 10 over the disk 4 according to an embodiment of the present invention. In this embodiment, the hub 12 comprises a multi-tier configuration including cylindrical 'surface 12A, cylindrical surface 12B, and cylindrical surface 12C. The disk 4 seats on cylindrical surface 12C with the cylindrical surface 12B being disposed axially through the aperture in the center of the disk 4. The beveled surface 22 of the disk clamp 10 (FIG. 2B) presses the disk 4 onto the cylindrical surface 12C, while screws are inserted through the apertures of the disk clamp 10 and screwed into the cylindrical surface 12B thereby clamping the disk 4 to the hub 12. During operation the spindle motor 6 rotates the hub 12 (and clamped disk 4) about a fixed shaft 26.

Figure 5:
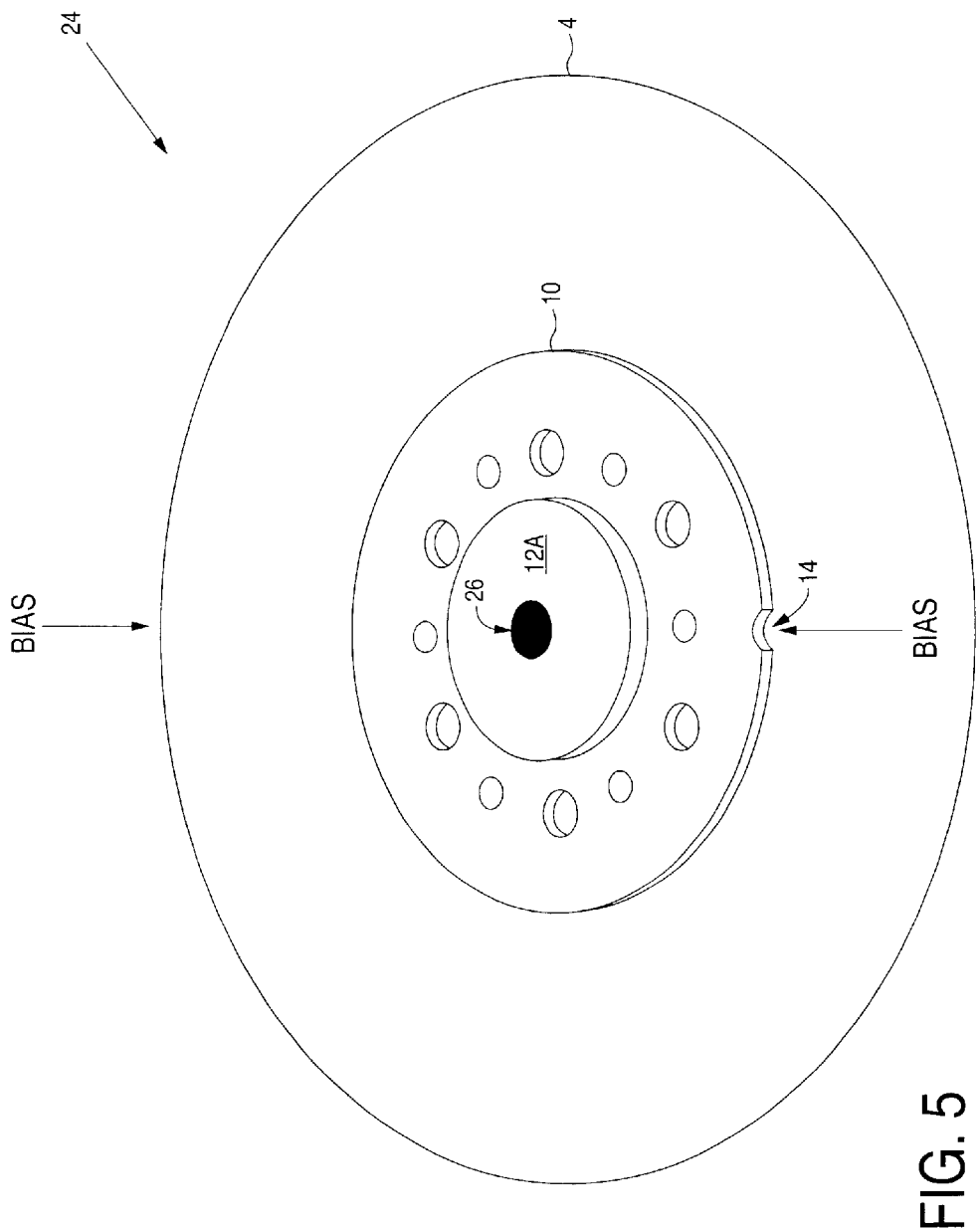
FIG. 5 illustrates an embodiment of the present invention wherein the disk is biased toward the notch of the disk clamp during assembly of the disk pack so that a center of the disk is offset from a center of the hub toward the notch.

FIG. 5 shows a perspective view of the disk pack 24 during the assembly process. In one embodiment, after placing the disk 4 onto the hub 12, a screw (or screws) are tightened to apply a stable clamping force on the disk 4. The disk 4 is then biased in a planar direction toward the notch 14 so that the center of the disk 4 is non-concentric relative to the hub 12. In one embodiment, the disk 4 is pressed against an outer diameter of the hub 12 at a location substantially opposite the location of the notch 14. Referring again to FIG. 4, the disk 4 is pressed against the cylinder defined by the cylindrical surface 12B. The screw (or screws) are then further tightened to apply a secure clamping force on the disk 4.

Figure 6:
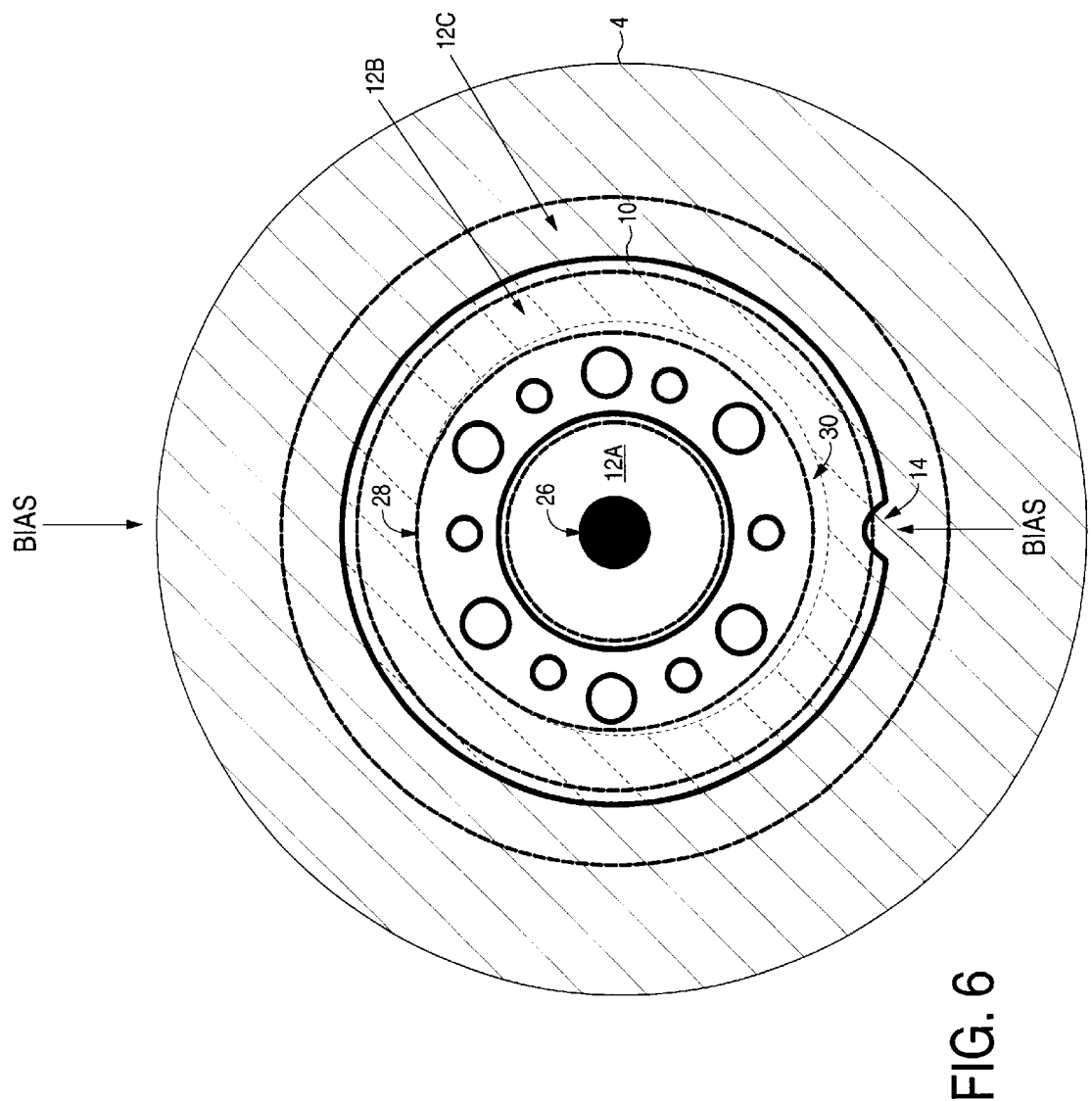
FIG. 6 shows a top view of the assembled disk pack wherein the disk presses against an outer diameter of the hub at a location substantially opposite the location of the notch in the disk clamp.

FIG. 6 shows a top view of the assembled disk pack 24 wherein the disk 4 presses against an outer diameter of the hub 12 at location 28 which is substantially opposite the location of the notch 14 in the disk clamp 10. As shown in FIG. 6, the resulting non-concentric orientation of the disk 4 leaves a small gap 30 between the inner diameter of the disk 4 and the hub 12. The non-concentric orientation of the disk 4 moves the center of gravity of the disk 4 away from the center of the hub 12 creating an imbalance which leads to disk wobble. Forming a notch 14 in the disk clamp 10 displaces an appropriate amount mass which moves the center of gravity of the combined disk 4 and disk clamp 10 back toward the center of the hub 12 thereby counteracting the imbalance and reducing disk wobble. In one embodiment, the size of the notch 14 is selected to displace a nominal amount of mass so that disk wobble is minimized on average for a family of disk drives.

In the above disclosed embodiments the disk clamp 10 comprises a ring-shape; however, the disk clamp 10 may comprise any suitable shape. In addition, any suitable spindle motor 6 may be employed, including a spindle motor which rotates a shaft 26 axially about the center of the spindle motor. In such an embodiment the disk clamp 10 comprises a disk-shape with a center aperture, wherein a screw is inserted through the center aperture and attached to the shaft in order to clamp the disk 4 to the shaft 26 (the hub in this embodiment).

We claim:
1. A disk drive comprising:
(a) a disk;
(b) a spindle motor for rotating the disk, the spindle motor comprising a hub
(c) a head actuated radially over the disk; and
(d) a disk clamp for clamping the disk to the hub, the disk clamp comprising a notch at a predetermined location along an outer diameter of the disk clamp, wherein:
the disk is aligned non-concentric with the hub such that a center of the disk is aligned offset from a center of the hub toward the notch;
the notch substantially counteracts an imbalance due to the non-concentric alignment of the disk with respect to the hub; and
an interior diameter of the disk presses against an outer diameter of the hub at location substantially opposite the location of the notch.

2. The disk drive as recited in claim 1, wherein the notch comprises an arc shape.

3. The disk drive as recited in claim 1, wherein the notch comprises a square shape.

4. A method of manufacturing a disk drive comprising the steps of:
(a) placing a disk onto a hub of a spindle motor;
(b) placing a disk clamp over the disk, the disk clamp comprising a notch at a predetermined location along an outer diameter of the disk clamp;
(c) biasing the disk in a planar direction toward the notch; and
(d) securing the disk clamp to the hub, wherein:
the disk is aligned non-concentric with the hub such that a center of the disk is aligned offset from a center of the hub toward the notch; and
the notch substantially counteracts an imbalance due to the non-concentric alignment of the disk with respect to the hub.

5. The method as recited in claim 4, wherein:
(a) the step of securing the disk clamp to the hub employs at least one screw;
(b) after placing the disk onto the hub, tightening the screw to apply a stable clamping force on the disk; and
(c) after biasing the disk in the planar direction toward the notch, further tightening the screw to apply a secure clamping force on the disk.

6. The method as recited in claim 4, wherein the notch comprises an arc shape.

7. The method as recited in claim 4, wherein the notch comprises a square shape.

8. The method as recited in claim 4, wherein an interior diameter of the disk presses against an outer diameter of the hub at a location substantially opposite the location of the notch.

* * * * *